United States Patent Office 3,170,287
Patented Feb. 23, 1965

3,170,287
MANIFOLDING OF IGNITERS IN LARGE
ENGINE CLUSTERS
Barnet R. Adelman, Atherton, Calif., assignor to United
Aircraft Corporation, a corporation of Delaware
Filed Apr. 19, 1962, Ser. No. 188,645
4 Claims. (Cl. 60—35.6)

This invention relates to rocket motors and more particularly relates to a novel ignition system for clustered rocket motors.

In any rocket motor it is necessary that the thrust vector of the motor pass through the center of gravity of the motor to prevent eccentric moments which would require large correction forces. When using a number of motors in a cluster, such as a cluster of solid propellant rocket motors used as a booster, there is always the possibility that one of the motors will not fire so that the thrust vector of the cluster will not pass through the center of gravity of the cluster. It is therefore highly desirable to take every precaution in clustered rocket motors to see that all of them ignite, and preferably ignite at substantially the same time.

In accordance with the present invention, a simple redundancy system is provided to reduce the possibility of one or more of the motors in a cluster failing to fire to essentially zero.

In accordance with the present invention, a manifold is provided between the igniters of a plurality of motors so that hot gas will be delivered from one igniter to the next so that if one of the igniters should fail initially, hot gas from an adjacent igniter will flow into the igniter, ensuring ignition of the motor. Although it has previously been proposed to provide manifolds between the thrust elements of clustered motors to equalize thrust, such structures have not generally been practical for the reason that extremely large manifold structures are required, greatly adding to the weight and decreasing the efficiency of the cluster. In accordance with the present invention, only a small manifold line is required since it is intended that only enough gas flow from one igniter to the next to ensure ignition rather than equalizing the thrust of the various rockets. Since the manifold can be made quite small, the weight of the cluster is not appreciably increased.

FIGURE 1 of the drawing is a side view in section of a cluster of two solid propellant rocket motors embodying the present invention.

Figure 1:
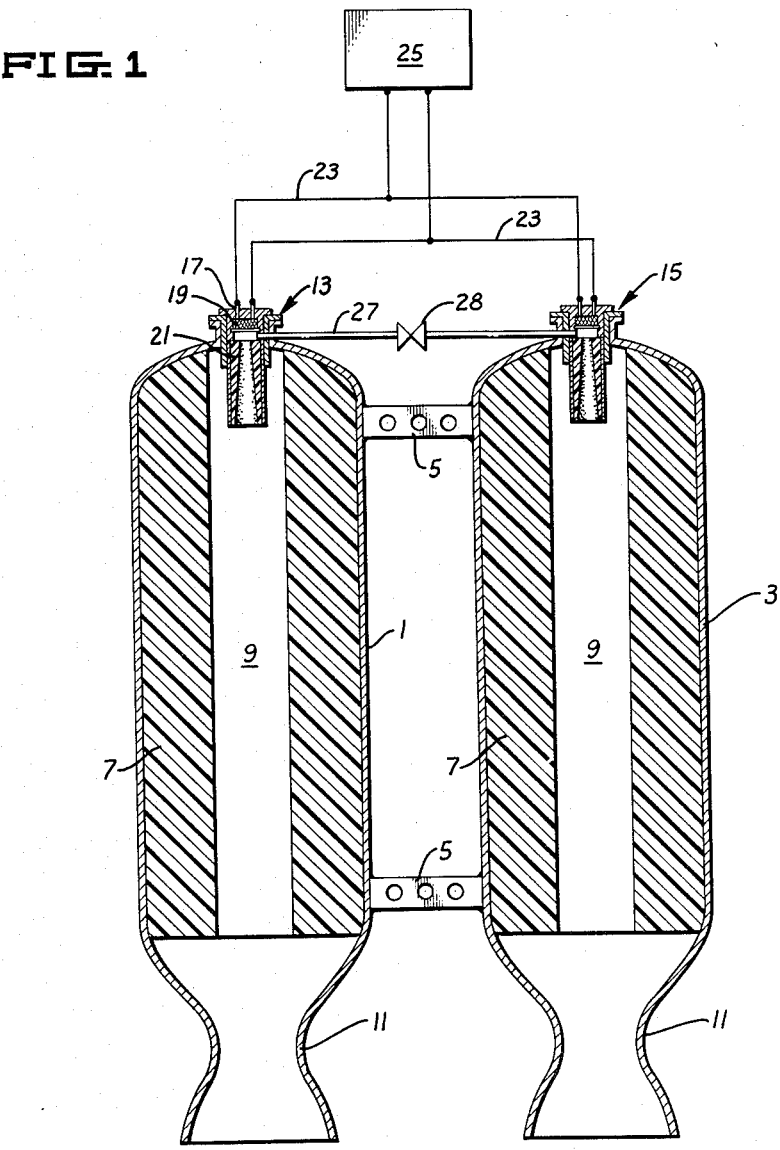

Referring now to the drawing by reference characters, there is shown in the figure a first rocket motor 1 and a second rocket motor 3 held in side-by-side relationship as a cluster by the structure 5. Each of the motors has a solid propellant grain 7 with a central burning port 9 and a nozzle assembly 11. Each of the motors has an independent igniter therein, that for motor 1 being generally designated 13 while that for motor 3 is generally designated 15. Each of the igniters comprises one or more electric squibs 17 inserted in a pyrotechnic mixture 19 said pyrotechnic mixture being adjacent to an igniter mixture 21. The electric squibs are connected by means of suitable wiring 23 to a common source of electricity 25 for ignition of the igniters. As will be apparent from the drawing, activation of the electric source 25 will cause the squibs 17 to ignite, in turn igniting the pyrotechnic 19 which causes the igniter mixture 21 to ignite. In the embodiment illustrated, the igniters 21 are small rockets and discharge their combustion products into the main combustion zones 9 causing the solid propellant grains 7 to ignite. In accordance with the present invention, a manifold line 27 leads between the two igniters 13 and 15 so that in the event one of the igniters fails to ignite, due to an electric malfunction, a malfunction of the pyrotechnic or the like, hot gas flows through the line 27 from the functioning igniter and ignites the other igniter ensuring the ignition of both the motors. Thus, redundancy is achieved at small cost and complication.

It will be obvious that many departures can be made from the exact structure shown. For instance, only two motors have been shown whereas in most practical installations a larger number would be clustered and connected by means of suitable lines so that the ignition of any one of them would ensure the ignition of all. For instance, even if the wiring to some particular igniter were destroyed, the cluster would be ignited in its entirety.

Figure 2:
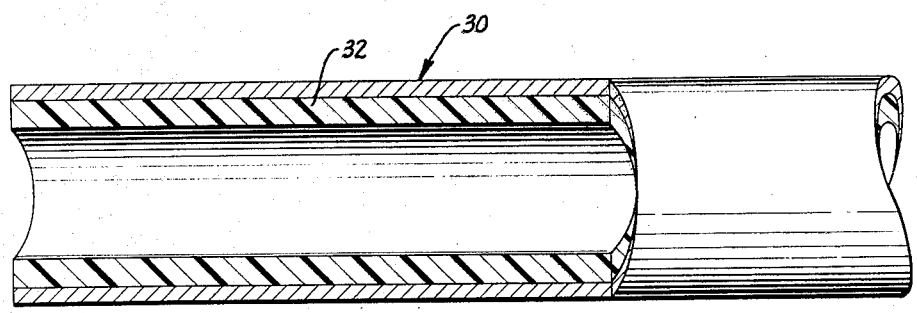
FIGURE 2 is an enlarged sectional view of a self-obdurating pipe which can be used to connect two or more igniters.
Figure 3:
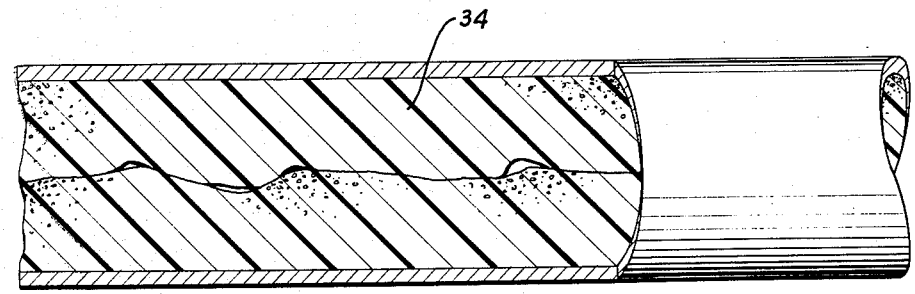
FIGURE 3 is a sectional view similar to FIGURE 2 showing the pipe after obduration has occurred.

In some instances it may be desirable to close the manifold line 27 after gas has flowed through the line in sufficient quantity to ensure ignition of the other igniter or igniters. As an example, a long burning center rocket motor might be clustered with a plurality of peripheral booster rocket motors of relatively short burning duration. Under these circumstances, it is obvious that after ignition has occurred it is desirable to close the manifold line prior to burn-out of any of the motors. This can be accomplished by means of a mechanical valve 28 as is shown in FIGURE 1 or a self-obdurating line as is shown in FIGURES 2 and 3 wherein a foaming plastic swells and closes the line when hot gas flows through it. Thus a pipe 30 having an interior coating 32 of a foaming material, which swells upon being subjected to a given amount of head, can be used to connect two or more igniters. After a sufficient amount of hot gas has passed through the line, the line will be choked as is shown in FIGURE 3 by the expanded mass 34 of the material which formerly formed the coating inside the pipe.

I claim:

1. A redundant ignition system for a cluster of rocket motors comprising a plurality of rocket motors formed in a cluster, each of said motors having an independent igniter therein, and a manifold line connecting each of said independent igniters to each other whereby hot gas can flow through said manifold line and ignite another igniter upon the ignition of any one of the igniters.

2. The structure of claim 1 wherein each of the igniters is a small rocket.

3. The device of claim 1 wherein a valve is provided in said manifold line to prevent the flow of gas after presence of heat for a predetermined time within the manifold line.

4. The device of claim 1 wherein the manifold line is provided with a foaming plastic interior coating said plastic serving to foam and obdurate the manifold upon the passage of hot gas therethrough for a predetermined time to develop a predetermined heat level.

References Cited by the Examiner
UNITED STATES PATENTS
2,683,963 7/54 Chandler _____ 60—35.6
2,693,675 11/54 Schaffer _____ 60—39.82 X SAMUEL LEVINE, Primary Examiner.
JULIUS E. WEST, Examiner.